United States Patent

[11] 3,581,962

[72] Inventor George M. Osborn
 275 Center St., San Rafael, Calif. 94901
[21] Appl. No. 870,483
[22] Filed Oct. 22, 1969
[45] Patented June 1, 1971

[54] AUTOMOBILE BICYCLE CARRIER
 6 Claims, 5 Drawing Figs.
[52] U.S. Cl. .................................................... 224/42.1,
 211/22, 214/152
[51] Int. Cl. ...................................................... B60r 9/04
[50] Field of Search .......................................... 224/42.1 E,
 42.03 B, 42.1 E, 42.1 G, 42.1 LM, 42.1 A; 211/17,
 20, 22, 24, 23, 184

[56] References Cited
 FOREIGN PATENTS
 25,289 1898 England ...................... 211/17
 61,237 1948 Netherlands ................. 211/24

Primary Examiner—Gerald M. Forlenza
Assistant Examiner—Jerold M. Forsberg
Attorney—George B. White ABSTRACT: A bicycle rack made of several detachable connected sections, each section being made of a longitudinal board connected at the ends by cross boards, and so spaced that the wheels of the bicycle can be placed between each pair of longitudinal boards. The boards are resiliently flexible so that a bolt in front and in back of each bicycle wheel can be tightened to press the boards against the opposite sides of the wheel thereby to securely hold the bicycle in place although the height of the boards is such that it extends only to about the point where the spokes begin to diverge outwardly from the plane of the tires. The bicycles are deposited in the slots so that the positions of adjacent bicycles are reversed, namely the handlebars of one bicycle are adjacent the seat of the next bicycle. The bicycles are deposited in the assembled rack on the ground then the sections are detached and each section is separately placed upon the usual automobile top carrier frame and when all the sections are in position they are again secured together and at the four corners of the assembled unit suitable clamps attach the entire unit to the top carrier frame.

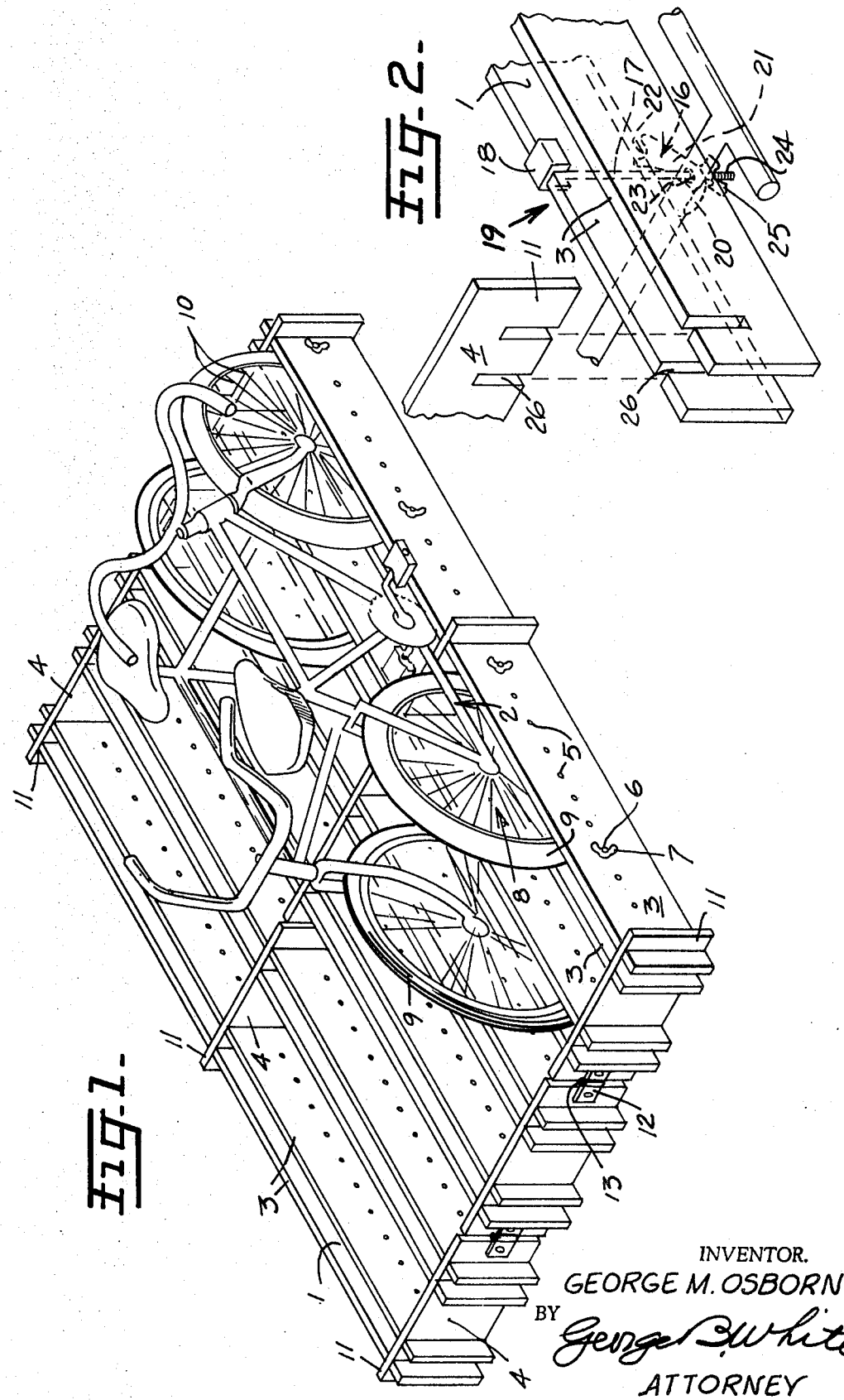

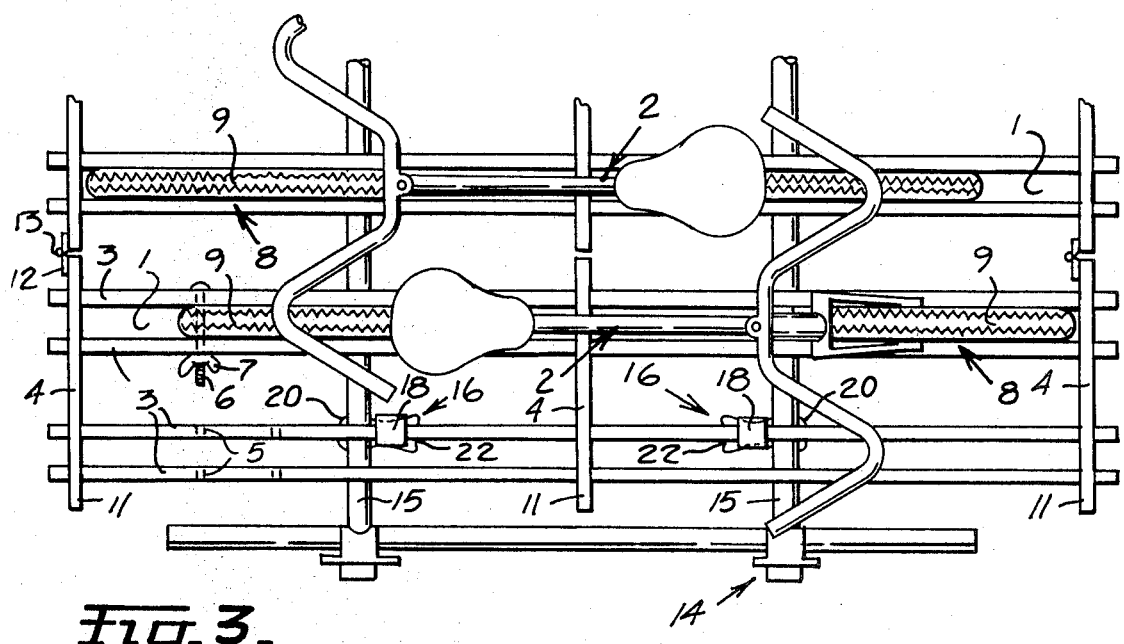
fig. 3.
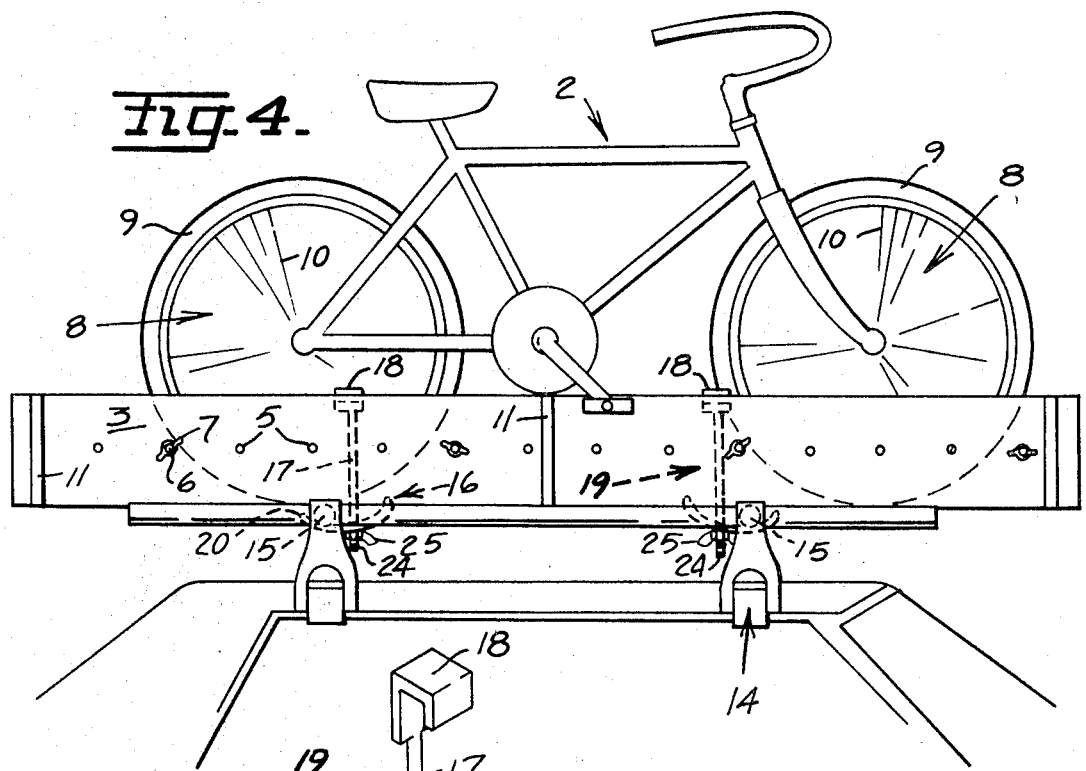
fig. 4.
fig. 5.
INVENTOR.
GEORGE M. OSBORN
BY
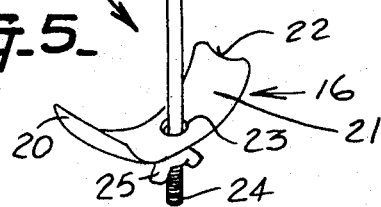
ATTORNEY

AUTOMOBILE BICYCLE CARRIER

BACKGROUND OF THE INVENTION

Automobiles are at present provided with carrier frames secured over the roof or top of the automobile, adapted to receive various kinds of packages or loads to be tied in place and carried on the top of the automobile. There are special frames also provided to carry bicycles on the roof of an automobile, as exemplified for instance in United States patents issued to Wheaton, U.S. Pat. No. 3,137,422 in which the bicycle is rested in a horizontal position and Yuda U.S. Pat. Nos. 3,204,839 and 3,260,429 in which the frame of the bicycle is clamped in a complex structure, but previous structures of such bicycle carriers had shortcomings, particularly the necessity for multiple clamping of each individual bicycle and the need for complicated mountings and cushionings, which, evidently, substantially prevented their widespread acceptance and use. In other types of prior art automobile bicycle carriers were adapted to mount a bicycle on the bumper of the automobile which exposed the bicycles to damage, or the bicycle, if mounted on the rear bumper, interfered with the rear vision of the driver and blocked access to the trunk of the car, and such prior carriers accommodated only a maximum of two bicycles on the bumper.

The primary object of the invention is to provide an automobile bicycle carrier in which up to six bicycles may be easily and safely transported by an automobile.

Another object of the invention is to provide an automobile bicycle carrier in which several bicycles can be individually and quickly deposited and fastened in position by holding the lower portions of the wheels of the bicycle tightly, maintaining the bicycle in upright position, and wherein the sections for holding several bicycles are detachably united so that the bicycle can be placed upon the usual carrier frame on the top of the automobile section by section and then the sections on the top of the usual carrier are again secured together and tightly clamped to said top carrier.

DESCRIPTION OF DRAWINGS

FIG. 1 is a perspective view of the sectional carrier assembled on the ground and the position of the adjacent bicycles.

FIG. 2 is a fragmental developed view of the connection between the end members or cross members and the longitudinal sides of the slots and also clamping arrangements to the automobile carrier.

FIG. 3 is a fragmental top view of the carrier clamped to the automobile top carrier.

FIG. 4 is a side view showing one bicycle in position on the top of the automobile.

FIG. 5 is a perspective view of the clamp.

DETAILED DESCRIPTION

The multiple bicycle carrier, in the herein illustrative embodiment, is made of three sections, each section having a pair of longitudinal slots 1 in which a pair of bicycles 2 can be deposited. The bicycles 2 are placed in the adjacent slots 1 so that the handlebar of one bicycle is adjacent to the seat of the other bicycle thereby to reduce the width of the carrier. The longitudinal sides 3 of each slot 1 are made of resiliently flexible material, for instance, suitable plywood. The ends of the longitudinal sides 3 are connected by suitable cross members 4 so as to hold the ends rigidly spaced.

The longitudinal sides 3 are provided with a series of holes 5 suitably spaced apart for accommodating clamping bolts 6 with a wingnut 7 at one end of each bolt 6. The holes on the opposite longitudinal sides 3 are in registry so that a bolt 6 can be inserted immediately in front and in the back of the bicycle wheel 8 in the slot 1. As the wingnut 7 is tightened the resiliently flexible longitudinal sides 3 are flexed toward one another and tightly pressed against the tire 9 of the bicycle wheel 8, for holding the bicycle in upright position. The height of the longitudinal sides 3 is such that it extends to about the area where the spokes 10 of the bicycle wheel diverge out of the plane of the tire 9, which is substantially the lower one-quarter of the bicycle wheel 8 and sufficient to maintain the bicycle in upright position.

The cross members 4 at the end of each pair of slots 1 extend beyond the longitudinal sides 3 to a distance of about one-half of the space between the adjacent slots 1. These extensions 11 have thereon suitable detachable connections 12.

A removable element 13 of each detachable connection 12 can be removed for detaching and can be inserted for securing together adjacent sections of the carrier.

The usual top carrier 14 for automobiles has suitable crossbars 15 transverse to the automobile top and the assembled bicycle carrier sections are secured to the crossbars 15 by clamps 16, preferably one at each corner of the assembled bicycle carrier. Each clamp 16 includes a bar 17 with a hook 18 at its top adapted to be hooked over the top edge of the adjacent longitudinal side 3. On the bar 17 is a slideable clamping claw 19. The clamping claw 19 has an arm 20 extended at right angles to the hook 18 and under the crossbar 15 of the top carrier 14. The other end of the claw 19 has an upwardly extended tongue 21 with a slit 22 fitting over the lower edge of the adjacent longitudinal side 3. A hole 23 in the clamping claw 19 is slideable on the bar 17. The lower end 24 of the bar 17 is threaded and a suitable fastening element, such as a wingnut 25 is threaded thereon for bearing against the underside of the clamping claw 19 and exerting a pull on the hook 18 to tightly clamp the adjacent longitudinal side 3 to the adjacent crossbar 15 of the automobile top carrier 14.

The method of mounting several bicycles on the top of an automobile, includes the following steps:

Attach together the several units of a bicycle rack on the ground so that the slots of the units are parallel.

Insert the bicycles in the respective slots so that the handlebars of adjacent bicycles are at opposite ends of the respective slots.

Adjust the bicycles forward or backward so that the bicycles do not interfere with each other.

Insert suitable filler boards for the smaller tired bicycles.

Insert tightening elements such as bolts with wingnuts or knob nuts in front and behind of each wheel of each bicycle and hand tighten the same so as to compress each slot against the adjacent inflated tire and thus rigidly hold the bicycle in upright position.

Detach the several units from one another and lift each unit separately on the top carrier bars on the top of the automobile and position it to one side of the car. Then lift the other units one by one in position on the top carrier bars of the automobile, and attach the several units together.

Finally, clamp the four corners of the assembled unit to the top carrier bars on the automobile.

In order to conveniently store and transport the bicycle carrier, the same are assembled together by overlapping slots 26 at the respective ends of the longitudinal sides of cross members 4 as shown in FIG. 2 of the drawings. In this manner the sides and cross members of the units can be stored flat and can be quickly assembled into the several units of the bicycle carrier.

I claim:
1. In an automobile bicycle carrier,
   longitudinal sides forming a slot therebetween for the wheels of a bicycle,
   cross members at the ends of said longitudinal sides to space said sides apart,
   means to press said longitudinal sides against the tires of the respective bicycle wheels to hold the bicycle in upright position, and
   means to clamp said sides to a carrier on the top of the automobile.
2. The automobile bicycle carrier specified in claim 1, and said cross members holding together a plurality of pairs of longitudinal sides thereby to form a plurality of parallel slots for supporting several bicycles.
3. The automobile bicycle carrier specified in claim 2, and said cross members being in several sections, and detachable means to secure together said cross member sections into a single support for several bicycles.

4. The automobile bicycle carrier specified in claim 3, and said clamping means including,
   a clamping bar,
   a hook at one end of the bar engageable with the top edge of the adjacent longitudinal side of the bicycle carrier,
   a claw member adjustable on the other end of the bar to engage said automobile top carrier and also the lower edge of said adjacent longitudinal side, and
   releasable means on the other end of said bar engaging said claw member to press the same in position and to pull said hook against said top edge.

5. The automobile bicycle carrier specified in claim 1, and
   said longitudinal sides having a series of registering holes therethrough,
   said pressing means including a bolt extended through registering holes on opposite sides of a slot ahead of each bicycle wheel and another bolt inserted into registering holes behind each bicycle wheel, and
   means to tighten the bolts so as to flex the adjacent longitudinal sides toward one another and against the tire of the bicycle wheel.

6. The method of mounting a plurality of bicycles on the top of an automobile comprising,
   securing together a plurality of bicycle carrier units having parallel slots for bicycle wheels,
   depositing the bicycles in the parallel slots so that the bicycles do not interfere with one another,
   tightening the sides in each slot against the adjacent tires of adjacent wheels of the bicycles in each slot so as to hold each bicycle rigidly in upright position,
   separating the secured units from one another,
   lifting each separated unit individually with the bicycles therein to the carrier frame on the top of the automobile,
   securing the individual units to each other on the top of the automobile, and
   clamping the secured units to the top carrier of the automobile.